United States Patent [19]

Fernbach

[11] Patent Number: 4,656,777
[45] Date of Patent: Apr. 14, 1987

[54] FISHING BOBBER ASSEMBLY

[75] Inventor: James L. Fernbach, Colerain Township, Hamilton County, Ohio

[73] Assignee: Alexis A. Fernbach, Cincinnati, Ohio

[21] Appl. No.: 828,853

[22] Filed: Feb. 12, 1986

[51] Int. Cl.$^4$ .............................................. A01K 93/00
[52] U.S. Cl. ..................................... 43/44.9; 43/44.92
[58] Field of Search ............................. 43/44.9, 44.92

[56] References Cited

U.S. PATENT DOCUMENTS

| 522,167 | 6/1894 | Rawlings | 43/44.9 |
| 2,872,752 | 2/1959 | Salzmann | 43/44.9 |
| 3,733,734 | 5/1973 | Hysaw | 43/44.9 |
| 3,736,690 | 6/1973 | Witkowski | 43/44.9 |

Primary Examiner—Nicholas P. Godici
Assistant Examiner—Christopher L. McKee
Attorney, Agent, or Firm—James W. Pearce; Roy F. Schaeperklaus

[57] ABSTRACT

A fishing bobber assembly. The assembly includes an elongated body having spaced end panels and an elongated bore. A radial slot in the body extends outwardly from the bore through an outer face of the body. The bobber assembly also includes plug members, each of which includes a stem frictionally receivable in the bore at one of the end panels and a head for bearing on said one of the end panels. An elongated bore in each plug member extends lengthwise of the stem and the head thereof. A radial slot extends from the bore of each plug member through an outer edge thereof. The slots of the plug members are alignable with the radial slot of the body so that a line can be inserted through the slots. The line is locked in the bores of the body and the plug members when the plug members are rotated from aligned position.

2 Claims, 9 Drawing Figures

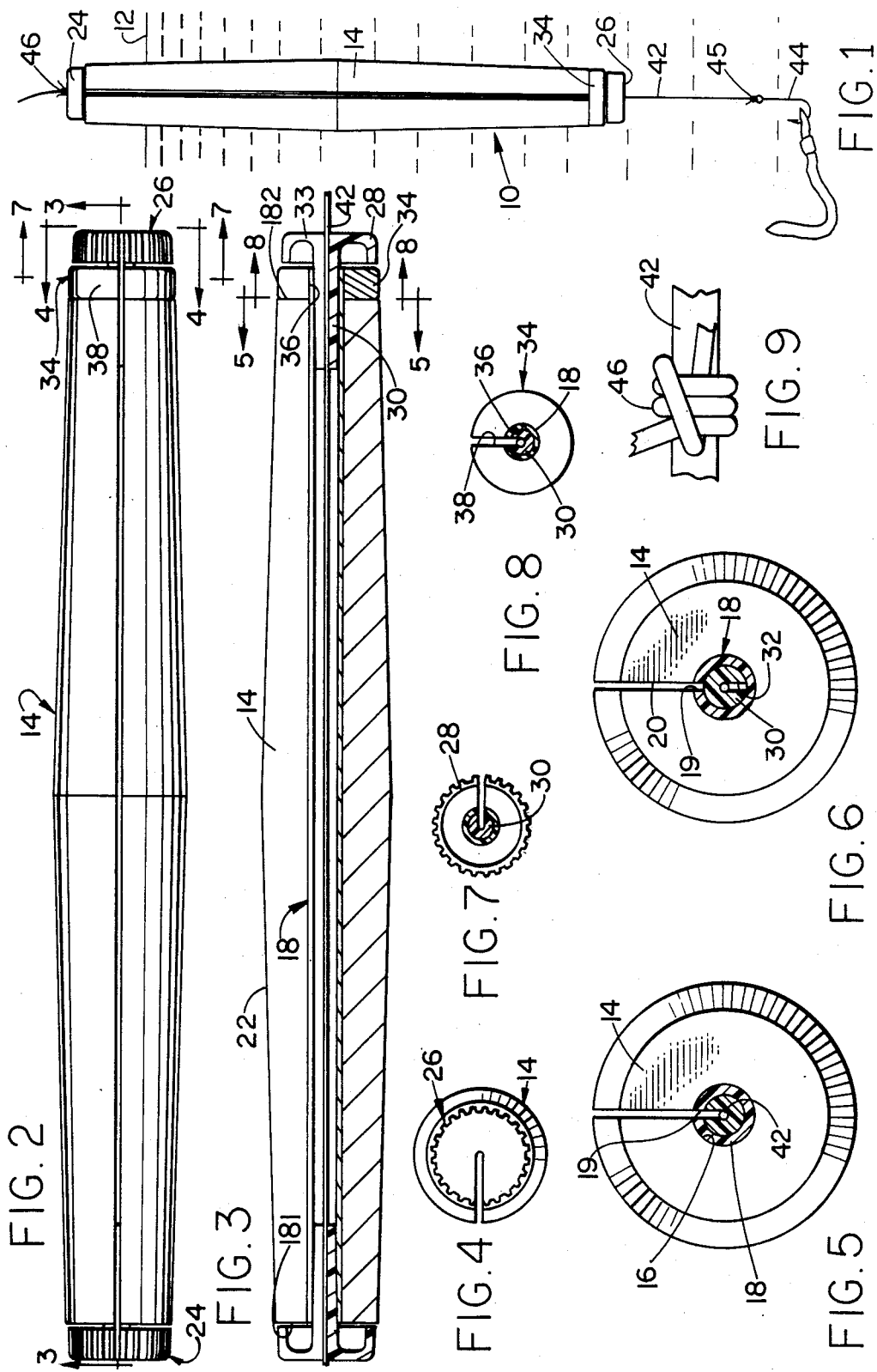

FISHING BOBBER ASSEMBLY

BACKGROUND OF THE INVENTION

This invention relates to fishing bobbers. More particularly, this invention relates to a fishing bobber through which a line extends so that the fishing bobber is slideably mounted on the line.

An object of this invention is to provide a fishing bobber which can be slideably mounted on a line without the need for dismantling objects mounted on the line.

BRIEF DESCRIPTION OF THE INVENTION

Briefly, this invention provides a fishing bobber assembly which includes a bobber body having a lengthwise bore in which a line can be mounted. A lengthwise radial slot in the bobber body communicates with the bore and extends through an outer face of the bobber body and permits the line to be mounted in the lengthwise bore. Plugs are frictionally mounted in opposite end portions of the lengthwise bore. Each of the plugs is provided with a generally radial slot alignable with the radial slot in the bobber body. The slot of each plug extends diameterally beyond the center of the plug to provide a central lengthwise open portion inside the plug for receiving the line. When the generally radial slots in the plugs are aligned with the radial slot of the bobber body, the line can be inserted radially into the lengthwise bore of the bobber body and into the central bores of the plugs. The plugs are turned to move the generally radial slots of the plugs out of alignment with the radial slot of the bobber body, and the bobber body and the plugs can slide along the line but are held in assembled relation with the line.

The above and other objects and features of the invention will be apparent to those skilled in the art to which this invention relates from the following detailed description and the drawings in which:

BRIEF DESCRIPTION OF THE DRAWINGS

FIG. 1 is a view in side elevation of a bobber assembly constructed in accordance with an embodiment of this invention, a line being shown in association therewith, the bobber assembly being shown floating in water, the water being shown in section;

FIG. 2 is a view in side elevation of the bobber assembly taken on an enlarged scale;

FIG. 3 is a view in section taken on the line 3—3 in FIG. 2, a line being shown in association with the bobber assembly;

FIG. 4 is a view looking in the direction of the arrows 4—4 in FIG. 2;

FIG. 5 is a view in section taken on the line 5—5 in FIG. 3;

FIG. 6 is a view in section taken on the same line as FIG. 5 but with a plug in rotated position;

FIG. 7 is a view in section taken on the line 7—7 in FIG. 2;

FIG. 8 is a view in section taken on the line 8—8 in FIG. 3; and

FIG. 9 is a fragmentary view on an enlarged scale in side elevation of a portion of a line with a knotted cord thereon.

In the following detailed description and the drawing, like reference characters indicate like parts.

DESCRIPTION OF PRESENTLY PREFERRED EMBODIMENT

In FIG. 1 is shown a fishing bobber assembly 10 floating in water 12. The bobber assembly includes an elongated bobber body 14 having a lengthwise central bore 16 in which a liner 18 is mounted. The bobber body 14 can be formed of balsa wood or the like. Ends of the bore 16 terminate in end panels 181 and 182 of the body 14. The liner can be formed of appropriate smooth plastic material or the like. The liner 18 is of generally C-shape in section and is provided with a lengthwise slot 19. A lengthwise radial slot 20 is formed in the bobber body 14 extending from the central lengthwise bore 16 through an outer wall 22 of the bobber body 14.

Plugs 24 and 26 are mounted in opposite end portions of the liner 18. The plugs 24 and 26 are similar in design and only the plug 26 will be described in detail. The plug 26 includes a disc-shaped head 28 and a stem 30. The stem 30 is frictionally received inside the liner 18. Each plug is provided with a generally radially directed slot 32. A portion 33 of the slot 32 extends into the head 28. The slot 32 is alignable with the slots 19 and 20 of the liner 18 and of the bobber body 14, respectively. Each plug can be rotated to bring the slots of the plug out of alignment with the slots 19 and 20 of the liner 18 and the bobber body 14, as shown in FIG. 6.

A metal weight 34 can be mounted on the liner 18. The weight 34 can be of generally cylinderical shape and is provided with a central bore 36, which receives the liner 18 and the stem 30 of the plug 26. The weight 34 is also provided with a radial slot 38, which communicates with the central bore 36. The radial slot 38 can be aligned with the lengthwise radially directed slot 20 of the bobber body 14.

When the slots in the body 14, the liner 18, the stems 30 of the plugs 24 and 26, and the weight 34 are aligned, as shown in FIGS. 3 and 5, a line 42 can be inserted into the center of the fishing bobber assembly 10. The plugs 24 and 26 can then be turned, as to the position shown in FIG. 6, to hold the line 42 in the lengthwise bore 16 of the body and inside the liner 18 so that the bobber can slide lengthwise of the line 42 without coming free of the line 42.

A hook 44 can be attached to a lower end portion of the line 42 below the bobber assembly 10 by an appropriate connection 45. A short length of line 46 can be mounted on the line 42 above the bobber assembly 10 and can be tightened into a knot on the line 42 as shown in FIG. 9.

The knot of the short length of line 46 and the connection 45 can be of sufficient size to form protuberances on the line 42 which can engage the plugs 24 and 26, respectively, to limit the sliding of the fishing bobber assembly 10 along the line 42 between limits of the protuberances.

The fishing bobber assembly 10 can slide freely on the line 42 as required within the limits of the knot of the short length of line 46 and the connection 45 and is firmly held in position on the line 42. However, if the plugs 24 and 26 are turned to bring slots into alignment, the fishing bobber assembly 10 can readily be removed from the line 42.

The fishing bobber assembly illustrated in the drawings and described above is subject to structural modification without departing from the spirit and scope of the appended claims.

Having described my invention, what I claim as new and desire to secure by letters patent is:

1. A fishing bobber assembly which comprises an elongated body having spaced end panels, there being an elongated bore in the body, ends of the bore being in the end panels, a smooth plastic liner in the bore of the body, there being a radial slot in the body extending outwardly from the bore through an outer face of the body, there being a slot in the liner alignable with the slot in the body, the liner extending outwardly of one of the end panels, a weight having a bore therein in which the outwardly extending portion of the liner is received, there being a radial slot in the weight extending from the bore of the weight through an outer face of the weight and alignable with the slot in the liner, and a pair of plug members, each of the plug members including a stem frictionally receivable inside the liner at one of the end panels and a head, the head of one of the plug members bearing on one of the end panels, the head of the other plug member bearing on the weight, there being an elongated bore in each plug member extending lengthwise of the stem and the head thereof and a radial slot extending from the bore thereof through an outer edge thereof, the radial slots of the plug members being alignable with the radial slots of the body, the liner and weight, the bores of the liner and the bores of the plug members capable of receiving a portion of a line, the line being held in the liner and in the bores of the plug members when the plug members are rotated from aligned position.

2. In combination with a fishing line having spaced protuberances thereon, a fishing bobber assembly which comprises an elongated body having spaced end panels, there being an elongated bore in the body, ends of the bore being in the end panels, a smooth plastic liner in the bore of the body, there being a radial slot in the body extending outwardly from the bore of the body through an outer face of the body, there being a slot in the liner aligned with the slot in the body, the liner extending outwardly of one of the end panels, a weight having a bore therein in which the outwardly extending portion of the liner is received, there being a radial slot in the weight extending from the bore in the weight through an outer face of the weight and alignable with the slot in the liner, and a pair of plug members, each of the plug members including a stem frictionally receivable inside the liner at one of the end panels and a head, the head of one of the plug members bearing on one of the end panels, the head of the other plug member bearing on the weight, there being an elongated bore in each plug member extending lengthwise of the stem and the head thereof and a radial slot extending from the bore thereof through an outer edge thereof, the radial slots of the plug members being alignable with the radial slots of the body, the liner and weight, the bores of the liner and the bores of the plug members receiving a portion of the line between the protuberances, the line being held in the liner and in the bores of the plug members when the plug members are rotated from aligned position, the protuberances being engageable with the heads of the plug members so that the fishing bobber assembly can slide along the line between limits of the protuberances.

* * * * *